United States Patent [19]

Walker et al.

[11] 4,200,806
[45] Apr. 29, 1980

[54] SCANNING FLOW INDICATOR FOR ROTAMETERS

[75] Inventors: Elijah C. Walker, Takoma Park; Horace E. Cascio, Hyattsville, both of Md.

[73] Assignee: The United States of America as represented by the Department of Health, Education and Welfare, Washington, D.C.

[21] Appl. No.: 900,641

[22] Filed: Apr. 25, 1978

[51] Int. Cl.² .......................................... G01N 21/26
[52] U.S. Cl. .................................. 250/577; 73/209; 250/231 R
[58] Field of Search .............. 250/577, 231 R; 73/209

[56] References Cited

U.S. PATENT DOCUMENTS

| | | |
|---|---|---|
| 3,388,258 | 6/1968 | Grant .................................. 250/577 |
| 3,404,568 | 10/1968 | Humber et al. . |
| 3,416,371 | 12/1968 | Locke . |
| 3,522,731 | 8/1970 | Wilson . |
| 3,623,365 | 11/1971 | Lowell et al. . |
| 3,699,560 | 10/1972 | Meunier et al. . |
| 4,003,255 | 1/1977 | Spencer . |

OTHER PUBLICATIONS

Brochure of Modulated Signal Output Systems, Meter Equipment Manufacturing Inc., 8603 Chardon Rd., Kirtland, Ohio.

Primary Examiner—David C. Nelms
Assistant Examiner—Darwin R. Hostetter
Attorney, Agent, or Firm—Browdy and Neimark

[57] ABSTRACT

A flow indicating attachment for a transparent rotameter column containing a visible float movable in accordance with the rate of fluid flow through the column consists of a reciprocating scanner moving parallel to the column in a flow rate range including the range of float movement and coupled to a potentiometer forming a synchronous analog scanning signal which is furnished to a recorder. The scanner has a photoelectric float-sensing assembly including a photocell connected in the analog scanning signal circuit. When the sensing assembly is shaded by the rotameter float, it produces an abrupt dip in the recorded analog scanning signal, thus providing a recorded indication of the float's position in the range covered by the track of the reciprocating scanner.

11 Claims, 6 Drawing Figures

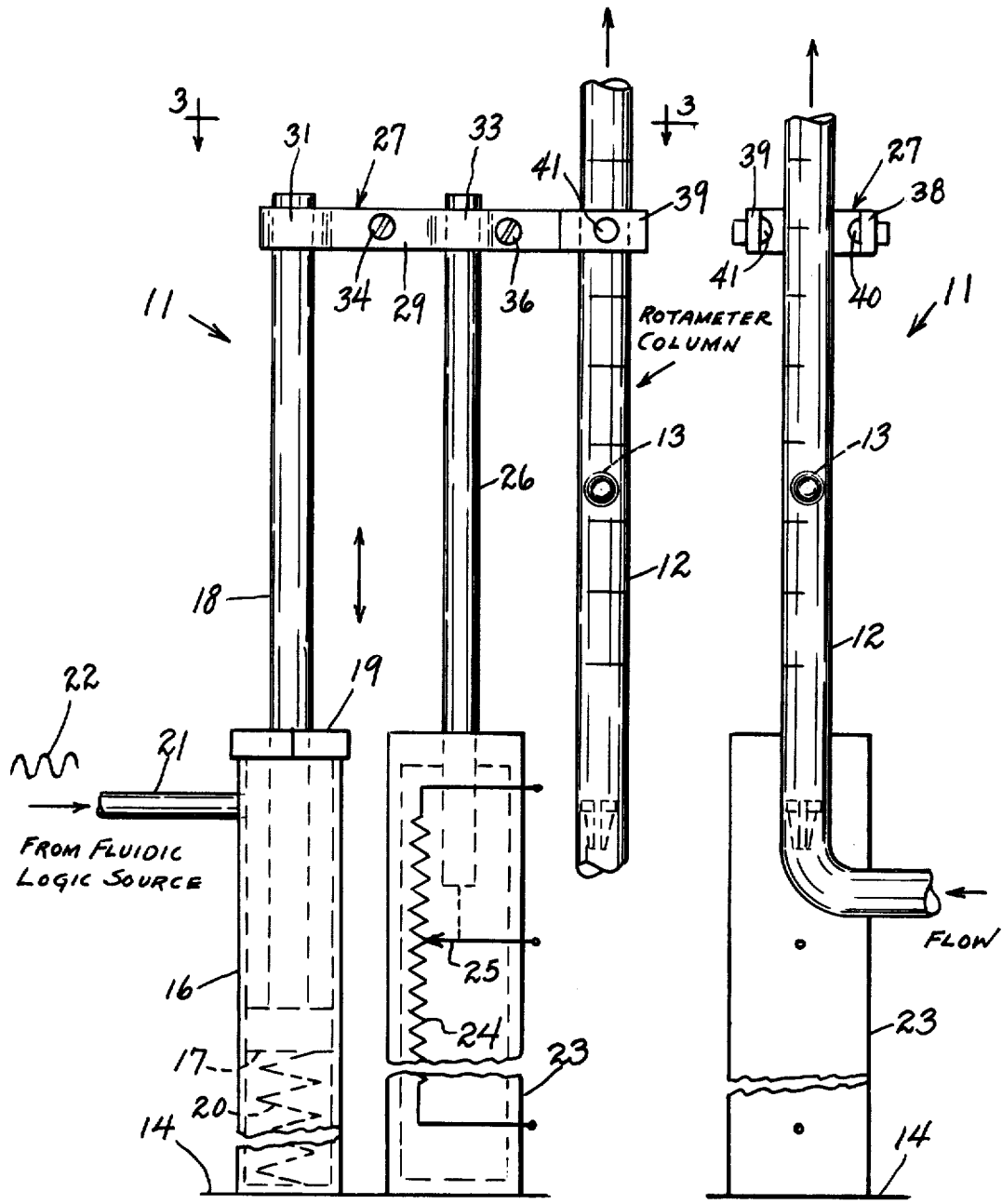

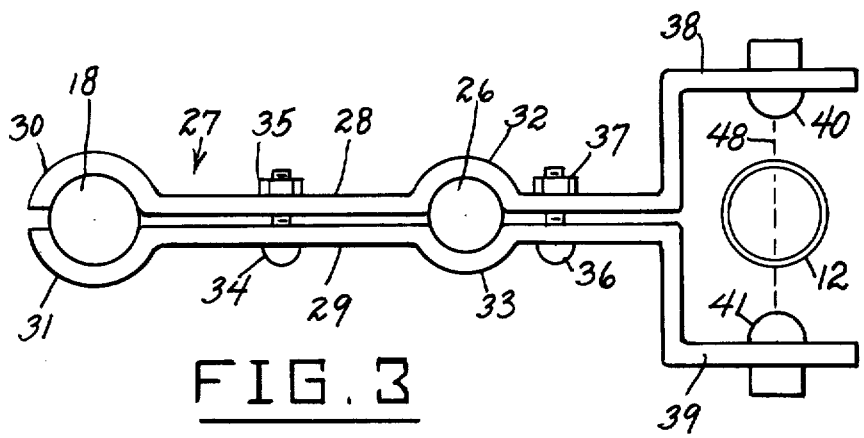
FIG. 3
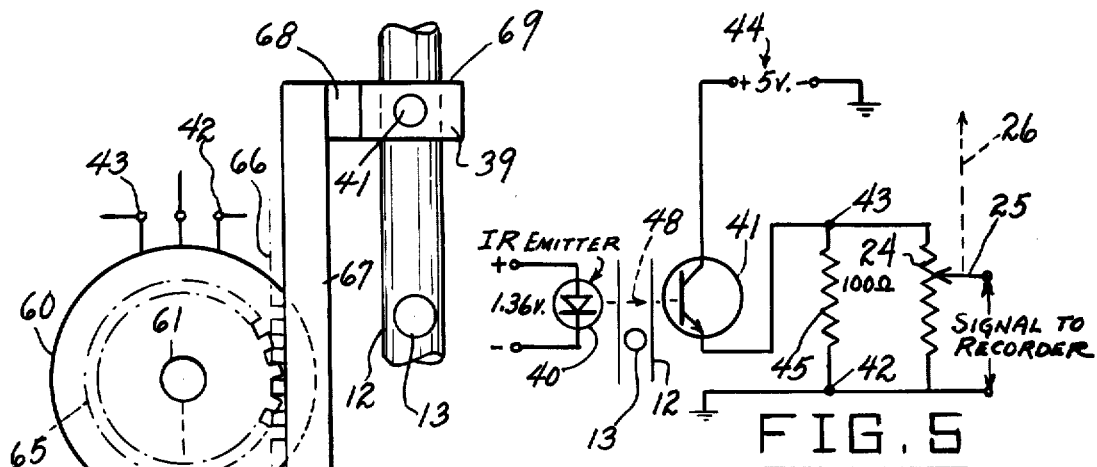
FIG. 4
FIG. 5
FIG. 6 a typical improved rotameter float-monitoring apparatus according to the present invention. The apparatus 11 is adapted to be used with a conventional transparent rotameter float column 12 of the type having a movable visible float 13 which responds to changes in fluid flow rate through the column 12 and moves therein so that said flow rate will be visually indicated by observing the position of the float along the column, which may be suitably inscribed with flow rate graduations along its length. The construction of a conventional fluid flow meter of this type is more specifically described, for example, in U.S. Pat. No. 3,623,365 to S. Lowell et al.

SCANNING FLOW INDICATOR FOR ROTAMETERS

FIELD OF THE INVENTION

This invention relates to position-monitoring apparatus, and more particularly to a device for monitoring the position of a float within a rotameter for the purpose of providing an electronic indication of the fluid flow within the rotameter.

BACKGROUND OF THE INVENTION

Devices in the prior art for monitoring the position of a float within a rotameter, or in other level or position indicators, have produced undesirable interference with the movement of the float or position indicator. For example, such prior art devices have used various attachments or couplings to the rotameter float to monitor the float position, and such attachments or couplings have seriously limited the performance of the float and reduced resolution of its position in the associated column.

Examples of such previously employed rotameter float-monitoring devices are found in the following prior art U.S. Pat. Nos., discovered as a result of a preliminary search:

Humber et al,—3,404,568
Locke,—3,416,371
Wilson,—3,522,731
Lowell et al,—3,623,365
Meunier et al,—3,699,560
Spencer,—4,003,255

SUMMARY OF THE INVENTION

Accordingly, a main object of the present invention is to provide a novel and improved system for monitoring the position of a rotameter float, or other indicating object subject to substantially linear positional change, which overcomes the deficiencies and disadvantages of the previously used devices.

A further object of the invention is to provide an improved method and apparatus for monitoring the position of a rotameter float, or similar indicator, which does not interfere with the movement of the indicator, which employs no mechanical connection or active coupling to the indicator, which provides substantially infinite indicator position resolution, and which is adaptable for use with any rotameter, or similar device, without limiting its performance.

A still further object of the invention is to provide an improved optical monitoring device for use with a rotameter to supervise the float position thereof and to continuously record said position, the device being inexpensive to fabricate, providing high resolutional accuracy, and which can be adapted to monitor the flow in relatively short rotameter columns as well as in long rotameters, with little increase in cost.

A still further object of the invention is to provide an improved rotameter float-monitoring apparatus which provides continuously recurrent recorder markers of the float position and thereby provides a continuous record of variations in fluid flow through a rotameter, which employs optical sensing of the float position and hence imposes no mechanical or other loading on the float, and which therefore does not interfere with the positional changes of the float under conditions of varying fluid flow.

BRIEF DESCRIPTION OF THE DRAWINGS

Further objects and advantages of the invention will become apparent from the following description and claims, and from the accompanying drawings, wherein:

FIG. 1 is a somewhat schematic, front elevational view of an improved rotameter float-monitoring apparatus in accordance with the present invention, of a type employing a linear potentiometer to generate its basic analog scanning signal.

FIG. 2 is a side elevational view of the apparatus shown in FIG. 1.

FIG. 3 is an enlarged top plane view taken substantially on the line 3—3 of FIG. 1.

FIG. 4 is a fragmentary diagrammatic front elevational view illustrating a modified float-monitoring apparatus according to the present invention, employing a rotary potentiometer to generate its basic analog scanning signal.

FIG. 5 is a wiring diagram of an analog scanning signal generating circuit employed in a rotameter float-monitoring apparatus such as that shown in FIGS. 1 and 4.

FIG. 6 is a graph showing a typical recorded trace of the analog scanning signal of a float-monitoring apparatus according to the present invention, with markers resulting from float detection.

DESCRIPTION OF PREFERRED EMBODIMENTS

Referring to the drawings, and more particularly to FIGS. 1, 2 and 3, 11 generally designates a typical improved rotameter float-monitoring apparatus according to the present invention. The apparatus 11 is adapted to be used with a conventional transparent rotameter float column 12 of the type having a movable visible float 13 which responds to changes in fluid flow rate through the column 12 and moves therein so that said flow rate will be visually indicated by observing the position of the float along the column, which may be suitably inscribed with flow rate graduations along its length. The construction of a conventional fluid flow meter of this type is more specifically described, for example, in U.S. Pat. No. 3,623,365 to S. Lowell et al.

The attachment 11 comprises a suitable base 14 on which is mounted an air cylinder 16, arranged parallel to the rotameter column 12, containing a piston 17 having a piston rod 18 extending slidably and sealingly through the center of the cylinder top cap 19. A biasing spring 20 may be provided in the bottom of the air cylinder 16 to bias the piston 17 to a normal quiescent position. A conduit 21 connects the upper portion of cylinder 16 to a suitable fluidic logic source, for example, to a source of substantially sinusoidally-varying pressurized air, whereby the piston rod is reciprocated substantially in accordance with the fluidic driving pressure wave form, shown at 22.

Mounted on the base 14 parallel to air cylinder 16 and column 12 is a linear potentiometer unit 23 having the potentiometer resistance winding 24 and the sliding contact element 25 which is drivingly coupled to a reciprocable rod 26 extending slidably through the top portion of the housing of unit 23, parallel to piston rod 18 and rotameter column 12. The top end portion of potentiometer drive rod 26 is clampingly coupled to the top end portion of piston rod 18 by a horizontal yoke assembly, designated generally at 27.

As shown in FIG. 3, the yoke assembly 27 may comprise a pair of opposing yoke bars 28,29 formed with opposing semi-circular seat portions 30,31 clampingly engaging piston rod 18 therebetween and opposing semi-circular seat portions 32,33 clampingly engaging a potentiometer drive rod 26 therebetween. Clamping force is exerted by respective clamping bolts and nuts 34,35 and 36,37 extending through and clamping the bars together on opposite sides of rod 26.

The ends of bars 28,29 are provided adjacent column 12 with outwardly offset opposing parallel arms 38,39 located substantially symmetrically on opposite sides of column 12.

Mounted on the arms 38,39 in transverse alignment with column 12 is a photoelectric float-detection array comprising an infrared emitter unit 40, which may be of the TIL34 type, and an infrared-sensing phototransistor 41, which may be of the TIL81 type. The emitter unit 40 is connected to a suitable energizing power source, not shown, such as a 1.36 volt battery, via flexible wires. Normally, phototransistor 41 is turned on responsive to exposure to the radiation from IR emitter unit 40, but is turned off when the light path between units 40,41 is blocked by the float 13.

As shown in FIG. 5, the collector and emitter of phototransistor 41 are connected in series with a battery 44 and the terminals 42,43 of a 100-ohm resistor 45. Potentiometer winding 24 is likewise connected across said terminals 42,43. Therefore, with the apparatus in operation, an analog scanning signal voltage 46 is present between sliding contact 25 and terminal 42, which is generally of the same form as and is proportional to the fluidicdriving pressure wave form 22, since the movement of contact 25 follows the reciprocations of piston 17. The scanning signal 46 is furnished to a conventional recorder, providing a trace such as that shown in FIG. 6.

In operation, the air cylinder 16, employing the above-described fluidic logic, causes the piston rod 18 to reciprocate vertically, as viewed in FIG. 1. This causes the IR emitter-detector pair 40,41 to scan the working length of the rotameter column 12. When the rotameter float 13 intersects the path of and interrupts the infra-red light beam 48 from the IR emitter unit 40, the output signal voltage 46 across slider 25 and terminal 43 abruptly falls. Since the detector 41 is used to control the voltage supply to the potentiometer winding 24, the potentiometer voltage abruptly changes, thus providing an electronic indication marker 47 on the recorder trace each time the float 13 interrupts the sensing beam 48 in FIG. 5.

The positions of the markers 47 on the recorder trace may be employed to measure the specific times at which the fluid flow rate intersects the normal analog signal scanning signal wave 46 (which is the analog of a selected fluid flow rate range). The recorder chart may be suitably calibrated so that the fluid flow rate values corresponding to the positions of the markers 47 may be easily read off.

The clamping position of the yoke assembly 27 on the rods 18,26 may be easily changed so as to vary the flow rate scanning range. Also, the apparatus can be built with other components which accomplish the same function. For example, FIG. 4 illustrates a configuration which employs a rotary potentiometer unit 60 instead of the linear potentiometer unit 23 of FIG. 1.

In FIG. 4, the rotary contact shaft 61 of the potentiometer 60 is drivingly coupled to a reversible electric motor 62 which is energized from a battery 63 through a conventional reversing switch 64. Shaft 61 also directly drives a pinion gear 65 which meshes with a rack bar 66 on the vertical reciprocating rod member 67, which in turn has a horizontal top arm 68 carrying a float-sensing array 69 similar to that above described, namely, which has opposite spaced arms 38,39 between which the vertical rotameter column 12 is located and which has a photoelectric float-sensing element 41 on one arm 39 and an infra-red emitter on the other arm to furnish an infra-red beam to element 41 which is interrupted at times by the float 13. The lower end of reciprocatory rod member 67 carries vertically spaced abutment members 70,71, with a reversing switch operating element 72 extending therebetween for reversing the motor 62 at predetermined upper and lower limiting positions of rod 67, thereby reversing the rotary movement of the rotary sliding potentiometer contact. This generates a periodically changing potentiometer signal synchronized with the scanning movement of the float-sensing array 69, which can be employed in a circuit similar to that of FIG. 5.

Also, within the spirit of the present invention, a more elaborate electronic circuit can be designed to give a non-varying analog or digital display of the float's position.

While certain specific embodiments of an improved scanning flow indicator for rotameters have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

We claim:

1. A fluid flow indicator comprising a transparent rotameter column containing a float movable in accordance with the rate of fluid flow through the column, scanning means adjacent the column, means to reciprocate said scanning means linearly parallel to said column in a range including at least a part of the range of float movement, said scanning means including photoelectric float-sensing means, potentiometer means including a movable contact, means to move said contact synchronously with the scanning means, a current source, circuit means connecting said current source to said potentiometer means so as to generate an analog signal at said contact varying synchronously with the movement of said scanning means, and means causing a relatively abrupt change in said analog signal responsive to the sensing of said float by said photoelectric sensing means.

2. The fluid flow indicator of claim 1, and wherein said float-sensing means comprises radiation-emitting means and photoelectric detection means supported on opposite sides of the column, with the float movable therebetween.

3. The fluid flow indicator of claim 2, and wherein the means causing the change in said analog signal comprises means connecting said photoelectric detection means in a circuit including said potentiometer means and said current source.

4. The fluid flow indicator of claim 1, and wherein the means to reciprocate said scanning means comprises reciprocating fluid pressure-operated drive means arranged to move parallel to said column, and means coupling said scanning means to said drive means.

5. The fluid flow indicator of claim 4, and wherein the contact-moving means comprises means coupling said contact to said fluid pressure-operated drive means.

6. The fluid flow indicator of claim 5, and wherein said fluid pressure-operated drive means comprises an air cylinder having a piston rod extending parallel to said column.

7. The fluid flow indicator of claim 6, and wherein the contact is provided with a drive rod element extending parallel to said column and said coupling means comprises a yoke assembly carrying the scanning means and means drivingly connecting said yoke assembly to said piston rod and said contact drive rod element.

8. The fluid flow indicator of claim 7, and wherein said yoke assembly comprises opposing outwardly offset arms extending on opposite sides of the column and said scanning means comprises radiation-emitting means and photoelectric detection means respectively mounted on the opposing arms in transverse alignment with the column.

9. The fluid flow indicator of claim 8, and wherein said radiation-emitting means comprises an infra red source and said photoelectric detection means comprises a phototransistor.

10. A method of monitoring a rotameter of the type having a column with a flow rate-responsive float therein, comprising linearly reciprocating a float sensor in a direction parallel to the column over a region including the path of movement of the float, generating an analog signal having a waveform corresponding to the reciprocating movement of the sensor, and modulating said signal when the float moves adjacent said sensor.

11. The method of claim 10, and wherein said analog signal is generated by moving the sliding contact of a potentiometer synchronously with the movement of the sensor.

* * * * *